United States Patent
Kajiwara et al.

(10) Patent No.: US 9,630,537 B2
(45) Date of Patent: Apr. 25, 2017

(54) VEHICLE INTERIOR COMPONENTS

(71) Applicants: TOYOTA BOSHOKU KABUSHIKI KAISHA, Aichi-ken (JP); TOYOTA JIDOSHA KABUSHIKI KAISHA, Aichi-ken (JP)

(72) Inventors: Takehiro Kajiwara, Aichi-ken (JP); Michiaki Kojima, Aichi-ken (JP)

(73) Assignees: TOYOTA BOSHOKU KABUSHIKI KAISHA, Aichi-Ken (JP); TOYOTA JIDOSHA KABUSHIKI KAISHA, Aichi-Ken (JP)

(*) Notice: Subject to any disclaimer, the term of this patent is extended or adjusted under 35 U.S.C. 154(b) by 0 days.

(21) Appl. No.: 15/025,752

(22) PCT Filed: Jun. 20, 2014

(86) PCT No.: PCT/JP2014/003327
§ 371 (c)(1),
(2) Date: Mar. 29, 2016

(87) PCT Pub. No.: WO2015/045225
PCT Pub. Date: Apr. 2, 2015

(65) Prior Publication Data
US 2016/0214515 A1 Jul. 28, 2016

(30) Foreign Application Priority Data
Sep. 30, 2013 (JP) ................................ 2013-204020

(51) Int. Cl.
*B60N 2/58* (2006.01)
*B60N 2/28* (2006.01)

(52) U.S. Cl.
CPC ............ *B60N 2/58* (2013.01); *B60N 2/2893* (2013.01)

(58) Field of Classification Search
CPC ................................ B60N 2/58; B60N 2/2893
(Continued)

(56) References Cited

U.S. PATENT DOCUMENTS

| 7,281,763 B1 * | 10/2007 | Hayashi | B60N 2/2893 |
| | | | 297/253 |
| 2007/0176476 A1 | 8/2007 | Weber | |
| 2009/0212610 A1 * | 8/2009 | Yajima | B60N 2/449 |
| | | | 297/217.1 |

FOREIGN PATENT DOCUMENTS

| DE | 102005006188 A1 * | 8/2006 | ........... B60N 2/2893 |
| DE | 10 2006 059 988 | 6/2008 | |

(Continued)

OTHER PUBLICATIONS

Office Action, along with English-language translation thereof, for JP Appl. No. 2013-204020 dated Oct. 6, 2015.
(Continued)

*Primary Examiner* — Milton Nelson, Jr.
(74) *Attorney, Agent, or Firm* — Greenblum & Bernstein, P.L.C.

(57) ABSTRACT

Embodiments of the present invention include a vehicle interior component. The vehicle interior component has a cover forming a design surface, and a tag attached to the cover. The tag has a first piece, a second piece and an attachment portion for attaching the first piece to the cover. The second piece has a first end integrated with the first piece, and a second end attached to the cover directly or indirectly. The second piece is laminated on the first piece while covering the attachment portion. Thus, the second piece is capable of using the attachment portion to suppress impairment of the design property of the vehicle interior component. The tag is attached to the cover in a manner helping to achieve a satisfactory outward appearance.

10 Claims, 5 Drawing Sheets

(58) Field of Classification Search
USPC .......... 297/463.1, 463.2, 253, 452.58, 219.1
See application file for complete search history.

(56) References Cited

FOREIGN PATENT DOCUMENTS

| | | |
|---|---|---|
| JP | 2001-270359 | 10/2001 |
| JP | 2010-155516 | 7/2010 |
| JP | 2012-11030 | 1/2012 |
| JP | 2013-121734 | 6/2013 |
| JP | 2013-189156 | 9/2013 |
| WO | 2005/087535 | 9/2005 |

OTHER PUBLICATIONS

International Search Report for PCT/JP2014/003327 dated Oct. 20, 2014.

\* cited by examiner

_US 9,630,537 B2_

VEHICLE INTERIOR COMPONENTS

CROSS-REFERENCE TO RELATED APPLICATIONS

The present application is a National Phase entry of, and claims priority to, PCT Application No. PCT/JP2014/003327, filed Jun. 20, 2014, which claims priority to Japanese Patent Application No. 2013-204020, filed Sep. 30, 2013, both of which are incorporated herein in their entireties by reference.

BACKGROUND

Embodiments of the present invention relate to vehicle interior components such as a vehicle seat. A vehicle interior component is provided, for example, with a cover forming a design surface, and a tag attached to the cover.

Japanese Laid-Open Patent Publication No. 2010-155516 discloses a vehicle seat as a vehicle interior component. The vehicle seat is configured to allow a child car seat to be installed on the vehicle seat. The vehicle seat has a seat cushion including a pad, a cover and a tag. The pad is formed of resin foam and defines the seat contour. At the rear portion of the pad, there is formed an enlarged portion protruding upwards toward a seatback. Insertion portions are formed at both ends in the width direction of the enlarged portion. Fixation arms for the child car seat are inserted into the insertion portions. The fixation arms are, for example, of a prism shape.

The cover is a sheet of cloth or the like. The cover forms a design surface by covering the pad. The cover has a plurality of pieces. A piece is arranged at the insertion portion and another piece is arranged above the insertion portion. The fixation arm is inserted via a slit formed between the pieces. The tag is a thin member with a substantially rectangular shape. The tag is sewn onto the cover above the slit. The upper side and both lateral sides of the tag are sewn to the piece. In a front view, the sewing line is of an upside-down reverse-U-shape. The tag serves as a mark when the fixation arm for the child car seat is inserted into the insertion portion. As a result, it is possible to smoothly insert the fixation arm into the insertion portion. The sewing line of an upside-down reverse-U-shape appears on the surface of the tag. Thus, the sewing line is exposed to an unnecessary degree thereby resulting in a rather poor outward appearance of the seat.

Thus, there has been a need for a seat in which a tag is attached to a cover without deterioration of the outward appearance of the seat.

SUMMARY

According to an aspect of the invention, certain embodiments of the present invention include a vehicle interior component. The vehicle interior component has a cover forming a design surface, and a tag attached to the cover. The tag has a first piece, a second piece and an attachment portion for attaching the first piece to the cover. The second piece has a first end integrated with the first piece, and a second end directly or indirectly attached to the cover. The second piece is laminated on the first piece while covering the attachment portion. Thus, by using the attachment portion, the second piece is capable of suppressing impairment of the design property of the vehicle interior component. Thus, the tag is attached to the cover in a manner helping to achieve a satisfactory outward appearance.

According to another aspect of the invention, the first and second pieces may be formed by folding a single sheet. The first end of the second piece may have an inner folding line resulting from inward folding of the sheet. The first piece extends from the inner folding line and is sewn to the cover. Thus, by using the inner folding line as a mark, it is possible to sew the first piece efficiently and neatly to the cover.

According to another aspect of the invention, the tag may have a covering portion protruding between the first and second pieces from the vicinity of an outer peripheral edge of the first or/and second pieces. Thus, the covering portion can suppress exposure of the inner side surface of the tag situated between the first and second pieces.

According to another aspect of the invention, the covering portion and the first piece may be formed by folding a single sheet. The covering portion may extend from an end of the first piece. This enables the covering portion and the first piece to be formed simply and easily.

DETAILED DESCRIPTION

Each of the additional features and teachings disclosed above and below may be utilized separately or in conjunction with other features and teachings to provide improved vehicle interior components. Representative examples of the present invention, which utilize many of these additional features and teachings both separately and in conjunction with one another, will now be described in detail with reference to the attached drawings. This detailed description is merely intended to teach a person of ordinary skill in the art further details for practicing preferred aspects of the present teachings and is not intended to limit the scope of the invention. Only the claims define the scope of the claimed invention. Therefore, combinations of features and steps disclosed in the following detailed description may not be necessary to practice the invention in the broadest sense, and are alternatively taught merely to particularly describe representative examples of the invention. Moreover, various features of the representative examples and the dependent claims may be combined in ways that are not specifically enumerated in order to provide additional useful configurations of the present teachings.

Figure 1:
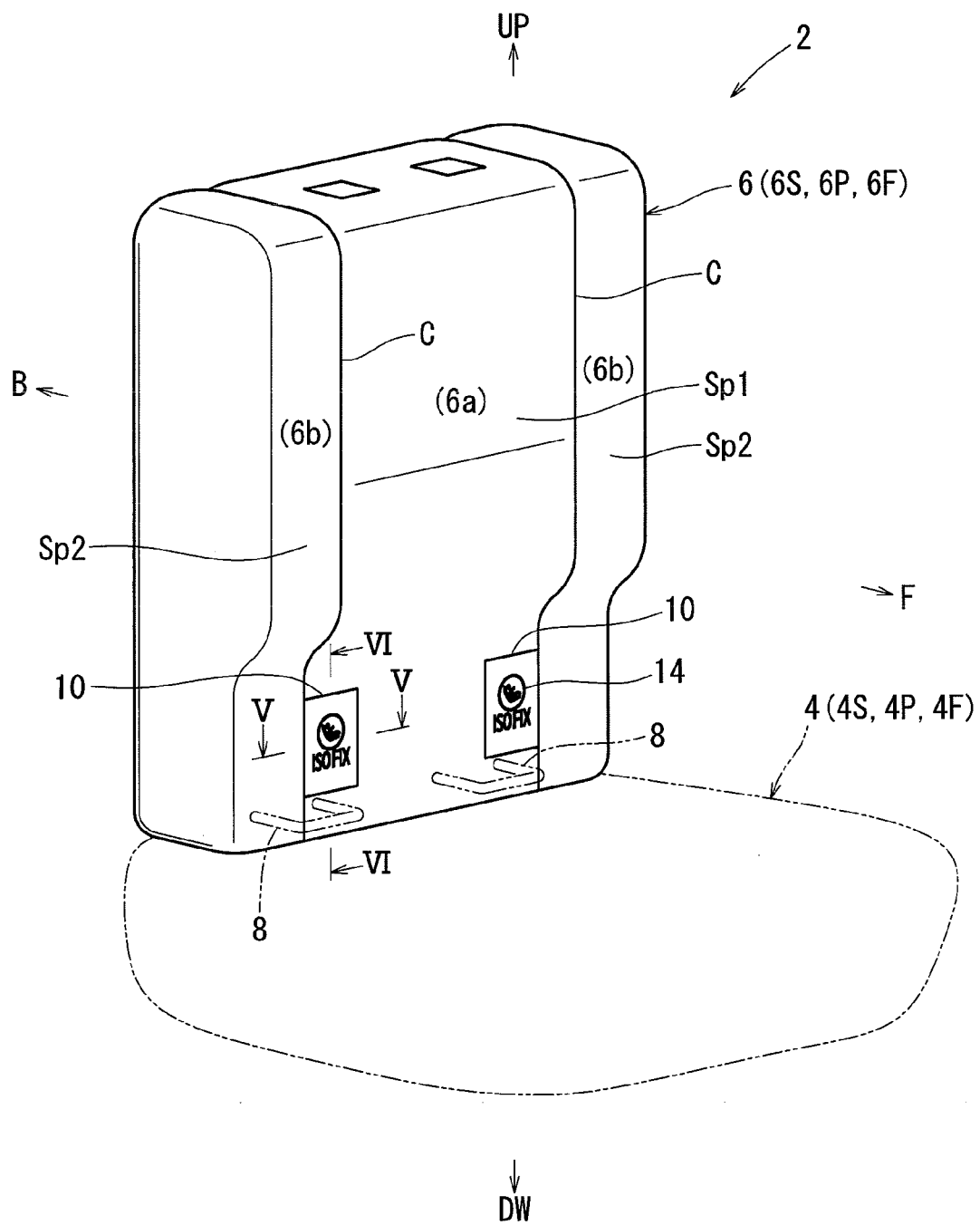
FIG. 1 is a perspective view of a vehicle seat.

An embodiment will be described with reference to FIGS. 1 to 6. In FIGS. 1 and 6, symbols F and B respectively indicate a front direction and back direction of a seat 2. In FIG. 1, symbols UP and DW respectively indicate an upper direction and lower direction of the seat 2. The seat 2 in FIG. 1 is mounted in a vehicle such as a car. The seat 2 has a seat cushion 4 and a seatback 6 as seat components. The seatback 6 is rotatably connected to the rear portion of the seat cushion 4. The seat components respectively have seat frames 4F and 6F, pads 4P and 6P defining the seat contour, and covers 4S and 6S covering the pads 4P and 6P.

The pads 4P and 6P are formed of resin foam such as polyurethane foam. The covers 4S and 6S are formed of cloth such as woven fabric, knitted fabric, non-woven fabric, natural leather or artificial leather. The covers 4S and 6S formed of leather or the like exhibit a rather poor breathability. In view of this, a plurality of holes may be formed in the covers 4S and 6S through perforation for promoting breathability.

As shown in FIG. 1, a pair of lock portions 8 is provided between the seat cushion 4 and the seatback 6. The pair of lock portions 8 is arranged on both side areas in the width direction of the seat 2. The lock portions 8 are bar members, and are of a substantially U-shape as seen from above. The seat 2 has a seating region where a user sits. The seating region is formed by the upper surface of the seat cushion 4 and the front surface of the seatback 6. It is possible to install a child car seat on the seating region of the seat 2. The child car seat has hook-like arms. The child car seat is arranged in the seating region, and the arms are hooked on the lock portions 8.

Tags 10 are provided on the cover 6S of the seatback 6. The tags 10 are provided in order to let an occupant know the positions of the lock portions 8. It is desirable for the tags 10 to be attached to the cover 6S so as to provide a satisfactory outward appearance.

As shown in FIG. 1, the pad 6P of the seatback 6 is installed on an arcuate seat frame 6F. After this, the pad 6P is covered with the cover 6S. The pad 6P has a main portion 6a at the center of the seat 2, and a pair of side portions 6b situated beside the main portion 6a. The main portion 6a is substantially rectangular as seen from a front view, and is substantially flat so as to allow the occupant to be seated thereon. The side portions 6b are situated on both sides of the seat back 6. The side portions 6b protrude forward and farther into the seating region than the main portion 6a. As a result, the side portions 6b can support the side portions of the occupant.

The cover 6S is a thin member forming the design surface of the seat 2. The cover 6S has a plurality of pieces, and is formed by sewing the plurality of pieces into a bag-like shape. The cover 6S has, for example, a first sectional piece Sp1 covering the main portion 6a, and a pair of second sectional pieces Sp2 each covering the side portions 6b. The first sectional piece Sp1 and the second sectional pieces Sp2 are sewn together via sewing lines C. On both sides of the seatback 6, the sewing lines C extend vertically between the main portion 6a and the side portions 6b. The sewing lines C are situated directly above the lock portions 8. The tags 10 are attached to the sewing lines C.

Figure 2:
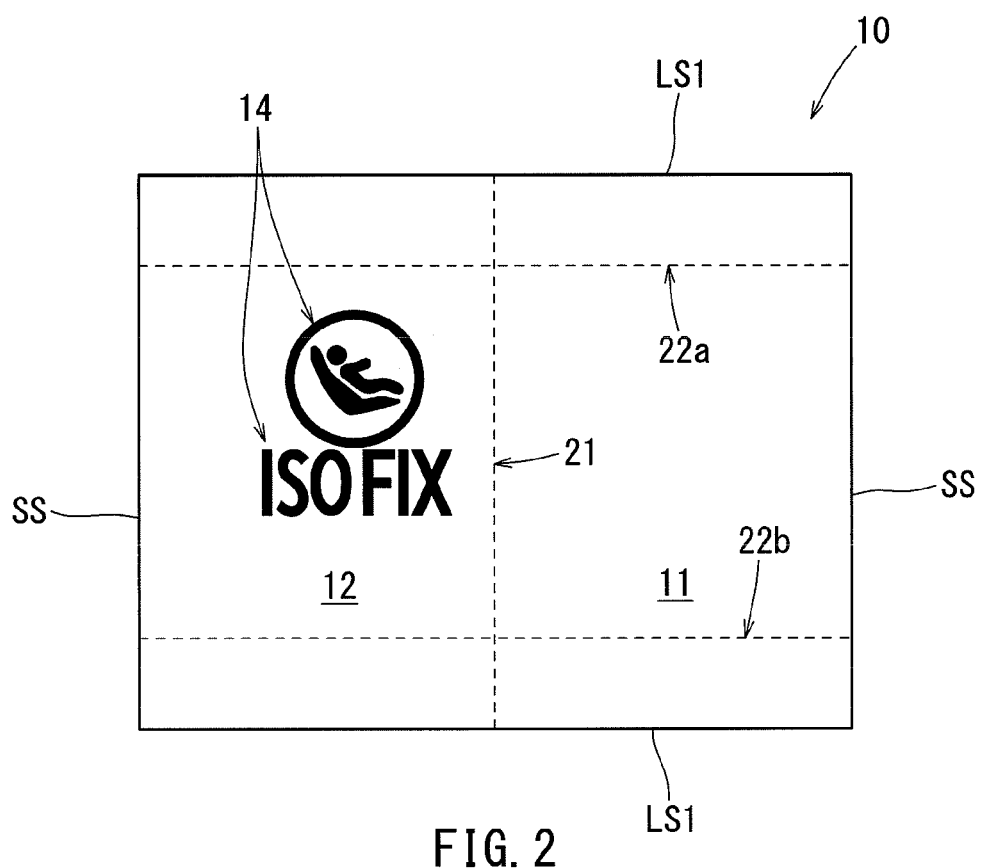
FIG. 2 is a developed view of a tag.
Figure 3:
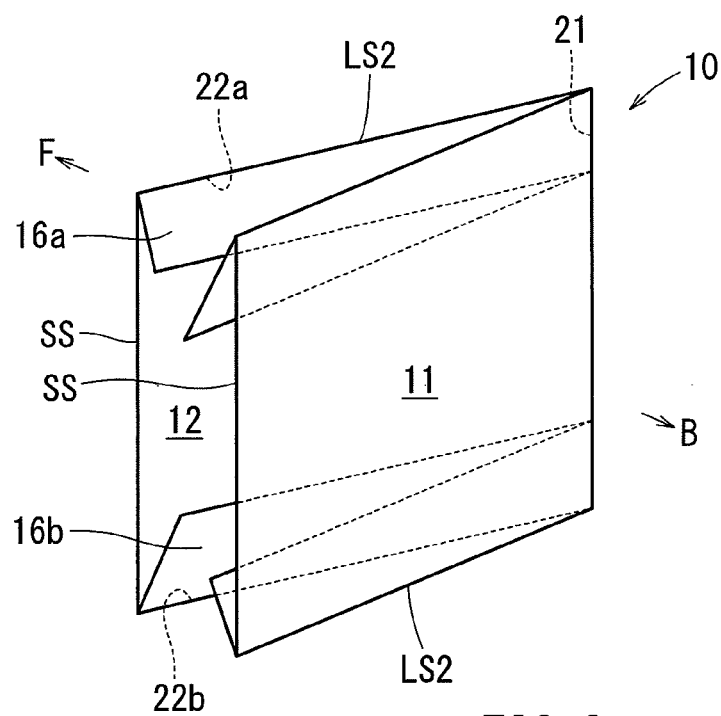
FIG. 3 is a perspective view of the tag in a folded state.
Figure 4:
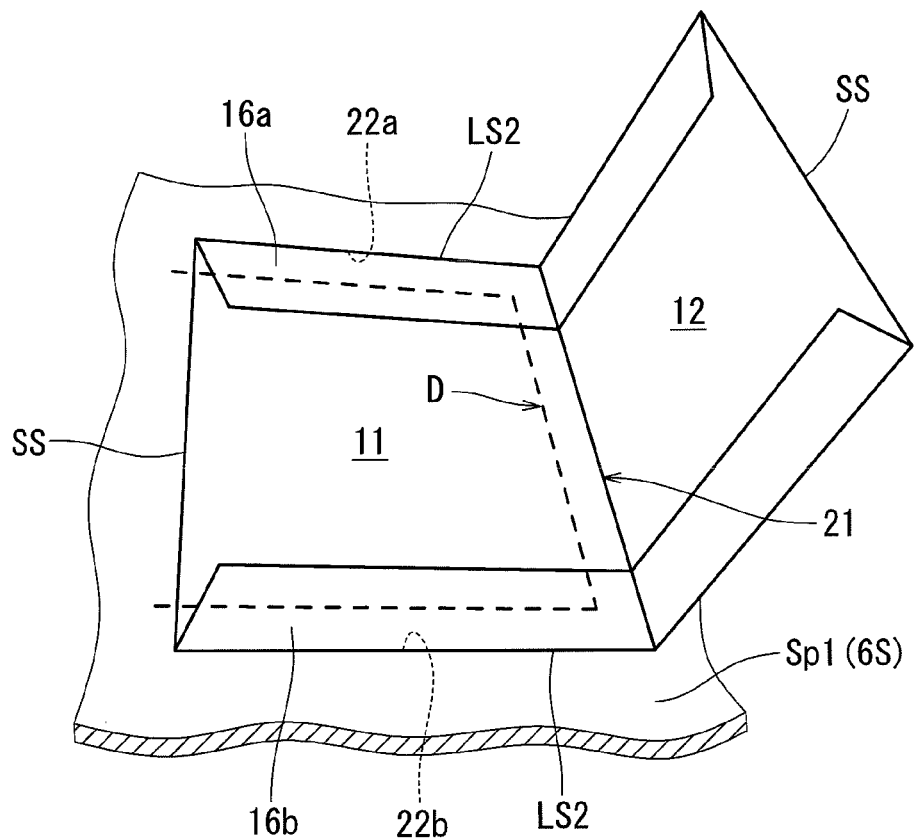
FIG. 4 is a perspective view of the tag and a part of a cover in a way of manufacturing process.

As shown in FIGS. 2 to 4, each tag 10 is a thin member that can be attached to the cover 6S. The tag 10 has inner folding lines 21, 22a, and 22b, a first piece 11, a second piece 12, a mark 14 and a pair of covering portions 16a and 16b. The tag 10 is a thin member which can be pierced by sewing thread. The tag 10 may be formed, for example, of the same material as the cover 6S, i.e., cloth, leather or woven fabric. The tag 10 may also be formed of a sheet material of rubber, elastomer or a soft resin such as vinyl chloride.

As shown in FIG. 2, in the developed state, the tag 10 is of a rectangle, and has a pair of longer sides LS1 and a pair of shorter sides SS. The tag 10 has a front surface exposed outside and a back surface disposed inside. The front surface is superior to the back surface in terms of its design. The design of the front surface can be enhanced by the weaving method, dyeing method, etc., which affects the way the warp and weft appear. The longer sides LS1 and the shorter sides SS, which are the end portions of the developed tag 10, are formed by being cut off from whole cloth. Thus, the end portions are subject to fraying.

As shown in FIGS. 2 and 3, the inner folding lines 21, 22a, and 22b form folding flaps of the tag 10. The inner folding lines 21, 22a, and 22b are formed, for example, by provisionally folding the tags 10 and subjecting it to heat press. The first inner folding line 21 is parallel to the shorter sides SS of the tag 10, and divides the longer sides LS1 at the center. The second inner folding lines 22a and 22b extend along the longer sides LS1, and divide the shorter sides SS. The second inner folding lines 22a and 22b are situated somewhat closer to the center than the longer sides LS1. The first piece 11 and the second piece 12 have substantially the same shape. The first inner folding line 21 is situated between the first piece 11 and the second piece 12. By inwardly folding the tag 10 at the first inner folding line 21, the first piece 11 and the second piece 12 are laminated to each other.

As shown in FIG. 1, the marks 14 indicate the positions of the lock portions 8. As shown in FIG. 2, each mark 14 is provided on the front surface of the second piece 12. The mark 14 can be integrally formed on the second piece 12 by various methods such as embroidery, printing and hand drawing. The mark 14 may be attached to the second piece 12 as a separate member such as a seal member or a resin sheet.

As shown in FIGS. 3 and 4, each of the covering portions 16a and 16b is situated between each of the second inner folding lines 22a and 22b and each of the longer sides LS1. The covering portions 16a and 16b are provided so as to extend along the longer sides LS1, and are arranged on the inner side of the longer sides LS1. The covering portions 16a and 16b are situated on the inner side of the tag 10, and are covered with the first piece 11 and the second piece 12. The second inner folding lines 22a and 22b form the longer sides LS2 of the tag 10 as completed. The longer sides LS2 exhibit a sharp shape free from fraying.

As shown in FIG. 1, the tags 10 are attached to the cover 6S in the vicinity of the sewing lines C when the cover 6S is formed. As shown in FIG. 4, the first piece 11 of the tag 10 is applied to the first sectional piece Sp1 of the cover 6S. The first piece 11 and the second piece 12 are opened, and the first piece 11 is attached to the first sectional piece Sp1 by sewing with a sewing machine.

A sewing line D is formed in a substantially C-shape along the peripheral edge of the first piece 11. The sewing line D has a first lateral portion extending straight along the covering portion 16a and the longer sides LS2. The sewing line D has a longitudinal portion bent from the first lateral portion in front of the first inner folding line 21 and extending straight along the first inner folding line 21. The sewing line D has a second lateral portion bent from the longitudinal portion and extending straight along the covering portion 16b and the longer sides LS2. The sewing line D is formed through bending at appropriate positions using the first inner folding line 21 as a mark, or along the inner folding line 21. Thus, the sewing line D is formed easily or neatly. The covering portions 16a and 16b are attached to the cover 6S while covering the back surface of the peripheral edge portion of the tag 10.

Figure 5:
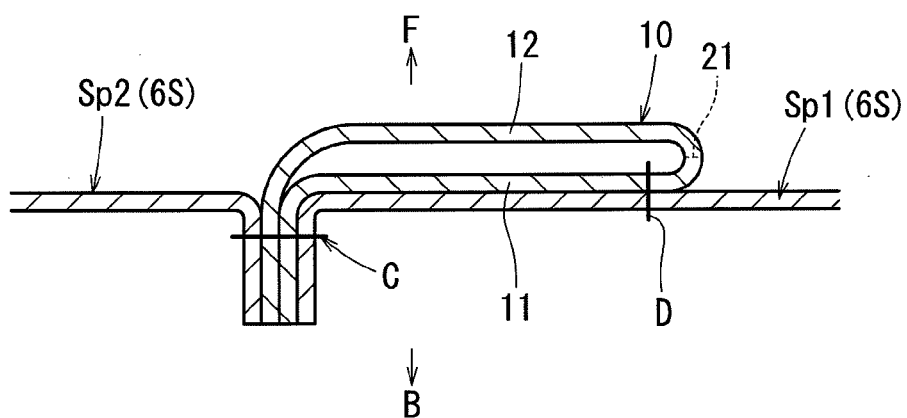
FIG. 5 is a cross-sectional view taken along line V-V in FIG. 1.
Figure 6:
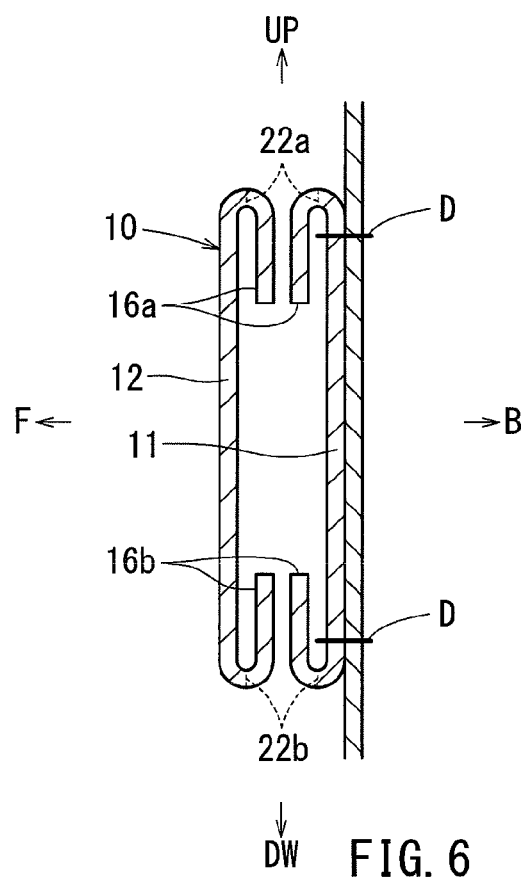
FIG. 6 is a cross-sectional view taken along line VI-VI in FIG. 1.

As shown in FIGS. 4 to 6, the tag 10 is folded at the first inner folding line 21 to laminate the second piece 12 on the first piece 11. The second piece 12 covers the entire surface of the first piece 11. On the side opposite the first inner folding line 21, the second piece 12 has a tip end region. The tip end region is sewn to the first sectional piece Sp1 and second sectional Sp2 together with the first piece 11. As a result, the first piece 11 and the second piece 12 are attached to the cover 6S. The second piece 12 covers and hides the sewing line D, which is the fixation position for the first piece 11 and the cover 6S. In the case where the cover 6S is formed of perforated leather or the like, the machine needle may get caught by a perforation in the material. This could result in meandering of the sewing line D of the first piece 11. In this situation, the second piece 12 covers such a meandering sewing line D. As a result, it is possible to prevent deterioration in the outward appearance of the seat 2.

As shown in FIG. 1, the tags 10 serve as a mark when hooking the arms of the child car seat on the lock portions 8. Thus, it is possible to smoothly hook the arms on the lock portions 8.

As shown in FIGS. 4 and 6, the tag 10 has the covering portions 16a and 16b. The tag 10 can undergo opening such that the second piece 12 is separated from the first piece 11. In this case, the covering portions 16a and 16b protrude into the inner side of the tag 10 from the first piece 11 and the second piece 12. Thus, the covering portions 16a and 16b can prevent exposure of the inner side surface of the tag 10. As a result, it is possible to suppress deterioration in terms of outward appearance to a great extent.

As stated above, the second piece 12 covers the sewing line D, which constitutes the fixation portion for the first piece 11 and the cover 6S. Thus, it is possible to suppress deterioration in terms of design due to the sewing line D. The sewing line D can be formed neatly, using the first inner folding line 21 as a mark. Thus, it is possible to sew the first piece 11 efficiently to the first sectional piece Sp1 of the cover 6S. The entire periphery of the peripheral edge of the first piece 11 is fixed to the cover 6S by the sewing lines C and D. Thus, the tag 10 can be securely attached to the cover 6S.

The covering portions 16a and 16b can suppress exposure of the back surface of the peripheral edge portion of the first piece 11. Thus, the tag 10 can be attached to the cover 6S so as to be of a satisfactory outward appearance.

While the embodiments of invention have been described with reference to specific configurations, it will be apparent to those skilled in the art that many alternatives, modifications and variations may be made without departing from the scope of the present invention. Accordingly, embodiments of the present invention are intended to embrace all such alternatives, modifications and variations that may fall within the spirit and scope of the appended claims. For example, embodiments of the present invention should not be limited to the representative configurations, but may be modified, for example, as described below.

The tag 10 may have a configuration and dimensions other than those described above. As described above, the seat 2 may have two tags 10. Alternatively, the seat 2 may have one or three or more tags 10. As described above, the tag 10 may be formed of a single thin member. Alternatively, the tag may have separate first and second pieces. Before attaching the first and second pieces to the cover, one end portion of the second piece may be attached to the first piece through bonding, fusion-bonding, sewing or the like.

The tag 10 may have the mark 14 on the second piece 12 as described above, or it may have no mark 14. As described above, the second piece 12 may have a configuration or a dimension that covers the entire first piece 11. Alternatively, the second piece 12 may have a configuration or a dimension that covers an area which could include the attachment portion of the first piece 11 and the cover 6S.

As shown in FIG. 5, the second piece 12 has a first end portion continuous with the first piece 11, and a second end portion on the side opposite the first end portion. The second end portion may be directly sewn to the cover 6S by the sewing line C extending in the vertical direction of the seat 2. Alternatively, the second end portion may be directly sewn to the cover 6S by a sewing line extending in some other direction such as the seat width direction.

The second piece 12 may be directly sewn to the cover 6S as shown in FIG. 5. Alternatively, the second piece 12 may be sewn to the cover 6S indirectly. For example, the tag may be in the form of a ring, and have a first piece and a second piece formed so as to be laminated each other by crushing the ring. The first piece is attached to the cover, with the tag being open in a ring-like fashion. In this way, the second piece may be indirectly attached to the cover via the first piece.

As shown in FIG. 4, the first piece 11 may be attached to the cover 6S by sewing. Alternatively, the first piece 11 may be attached to the cover by bonding, fusion-bonding, a hook and loop fastener, a zip fastener, a slide fastener, stapling, etc. The first piece may involve the generation of wrinkles as a result of bonding or the like, and the wrinkles can be covered by the second piece. The fastener or the like, attaching the first piece to the cover, can be covered with the second piece.

The first inner folding line 21 may be formed in the configuration and at the position as shown in FIG. 4. Alternatively, the first inner folding line 21 may be formed in some other configuration or at some other position. For example, the first inner folding line may be set such that the second piece is larger than the first piece. The tag 10 may or may not have the inner folding line 21.

As shown in FIG. 3, the tag 10 may have covering portions 16a and 16b formed by inwardly folding the longer sides LS1. Alternatively, the tag 10 may have only one of the covering portions 16a and 16b according to the construction of the interior component. Alternatively, the tag 10 may have no covering portions 16a and 16b. Alternatively, the tag 10 may have covering portions formed by inwardly folding the shorter sides.

As shown in FIG. 1, the tag 10 is provided in order to make known the position of the lock portion 8 for arranging the child car seat. Alternatively, the tag may be provided in order to make known the positions of various members such as an airbag.

The above construction is applicable to the seatback 6. Alternatively, the above construction may be applied to various other seat components such as the seat cushion 4, a headrest, an armrest, and a footrest. The tag may be provided in correspondence with the position of the lock portion so as to be in conformity with the seat component. The above seat may be provided in various vehicles such as a car, an airplane, and an electric train.

As shown in FIGS. 4 and 5, the tag 10 may have the attachment portion, and the attachment portion may include sewing lines C and D. The sewing lines C and D extend along four edges of the first piece 11 in a rectangular shape. Thus, the sewing lines C and D may attach firmly the first piece 11 to the cover 6S.

Figure 7:
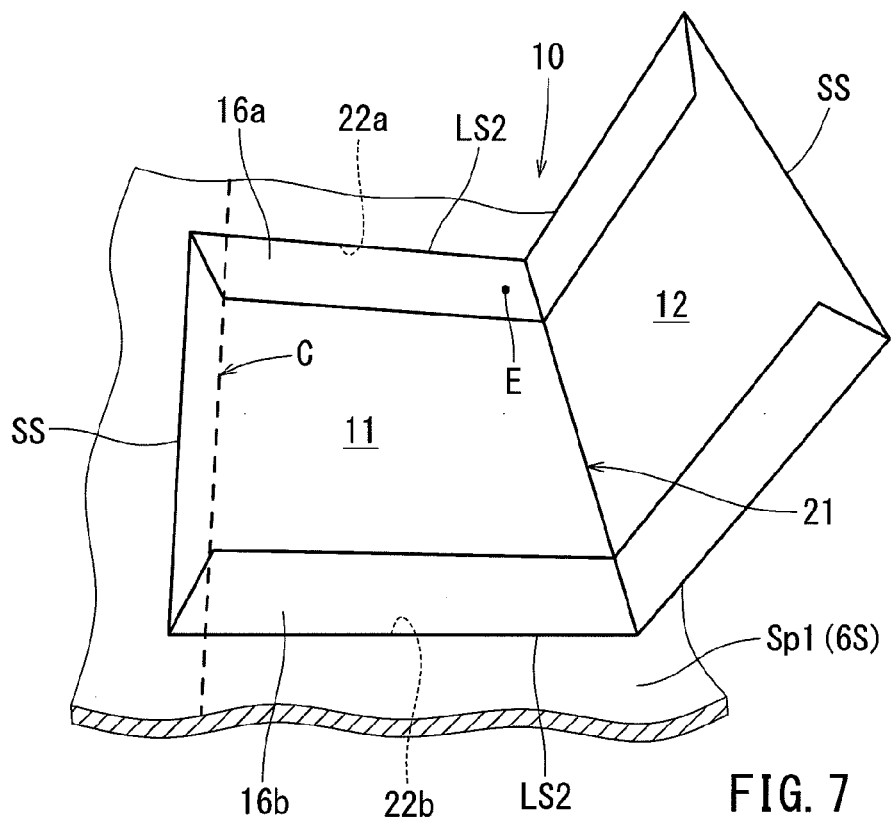
FIG. 7 is a perspective view of the tag with another attachment portion and a part of a cover in a way of manufacturing process.

As shown in FIG. 7, the attachment portion for attaching the first piece 11 to the cover 6S may include an attaching point E and the sewing line C instead of the sewing lines D shown in FIG. 4. The attaching point E may be formed through sewing, welding or bonding etc. The attaching point E is located adjacent to a corner of the first piece 11. The corner is located on an upper edge of the first piece 11 near the boundary of the first piece 11 and the second piece 12. Thus, the attaching point E can prevent the tag 10 from dropping. The tag 10 may lean on the cover 6S by using gravity. The attaching point E occupies small area or a point area. Accordingly, the attaching point E may be formed in a shorter time than the sewing lines D.

Figure 8:
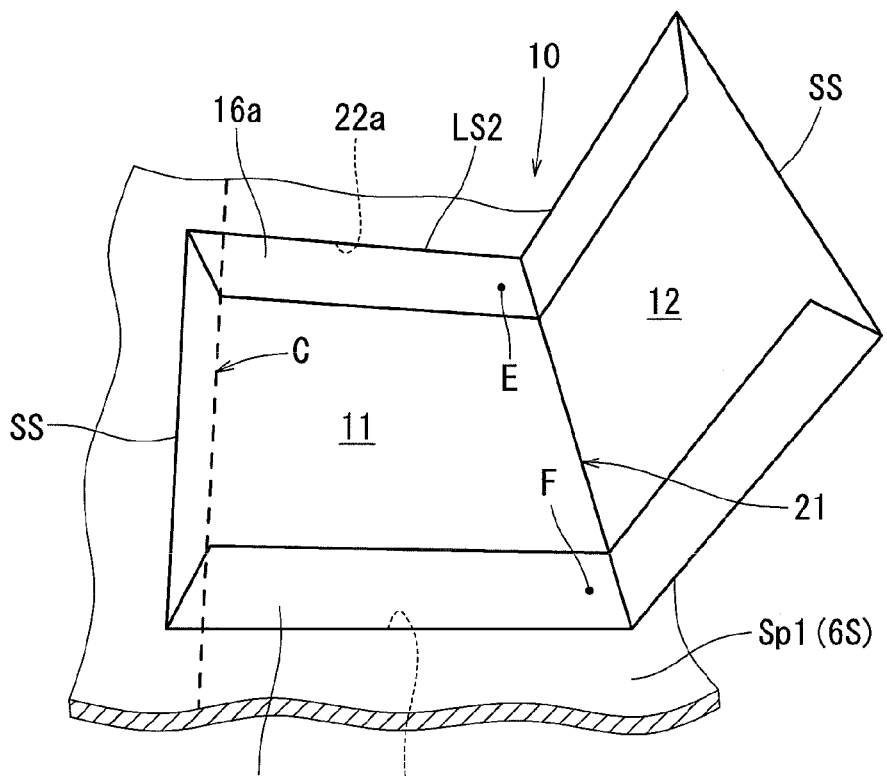
FIG. 8 is a perspective view of the tag with another attachment portion and a part of a cover in a way of manufacturing process.

As shown in FIG. 8, the attachment portion may include attaching points E and F and the sewing line C instead of the sewing lines D shown in FIG. 4. The attaching points E and F may be formed through sewing, welding or bonding etc. The attaching points E and F occupy small areas. The attaching points E and F are located adjacent to first and second corners of the first piece 11. The first corner is located on an upper edge of the first piece 11 near boundary of the first piece 11 and the second piece 12. The second corner is located a lower edge of the first piece 11 near the boundary of the first piece 11 and the second piece 12.

Figure 9:
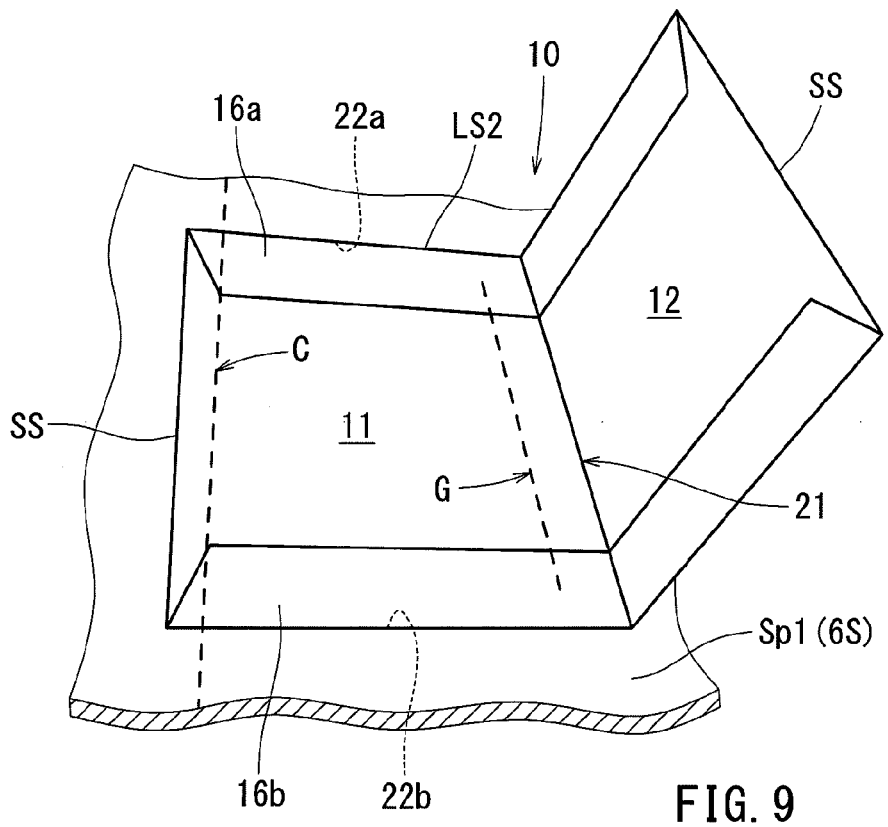
FIG. 9 is a perspective view of the tag with another attachment portion and a part of a cover in a way of manufacturing process.

As shown in FIG. 9, the attachment portion may include sewing lines C and G instead of the sewing lines D shown in FIG. 4. The sewing lines C and G extend along right and left edges and pass near four corners of the first piece 11. Thus, the sewing lines C and G may firmly attach the first piece 11 to the cover 6S. The sewing lines C and G do not extend along upper and lower edges. Accordingly, the sewing line G may be formed in a shorter time than the sewing lines D.

What is claimed is:

1. A vehicle interior component comprising:
   a cover that defines a design surface; and
   a tag attached to the cover, the tag having
      a first piece,
      an attachment portion that attaches the first piece to the cover, and
      a second piece having
         a first end integrated with the first piece,
         a second end that is one of directly and indirectly attached to the cover, and
         a cover portion protruding between the first piece and the second piece from an outer peripheral edge of at least one of the first piece and the second piece, wherein
   the second piece is laminated on the first piece and covers the attachment portion.

2. The vehicle interior component of claim 1, wherein the first piece and the second piece are defined by a single folded sheet.

3. The vehicle interior component of claim 2, wherein the first end of the second piece has an inner fold line resulting from an inward fold of the sheet, and the first piece extends from the inner fold line and is sewn to the cover by at least one sew line.

4. The vehicle interior component of claim 1, wherein the first piece and the second piece are opened, and the first piece is sewn to a first sectional piece of the cover with a sewing machine.

5. The vehicle interior component of claim 1, wherein the cover portion and the first piece are defined by a single folded sheet, and
the cover portion extends from an end of the first piece.

6. The vehicle interior component of claim 1, wherein the attachment portion includes at least one sew line.

7. The vehicle interior component of claim 6, wherein the at least one sew line attaches two sectional pieces of the cover.

8. The vehicle interior component of claim 6, wherein an entire peripheral edge of the first piece is fixed to the cover by the at least one sew line.

9. A vehicle interior component comprising:
   a cover that defines a design surface; and
   a tag attached to the cover, the tag having
      a single folded sheet that defines a first piece and a second piece, the second piece having a first end integrated with the first piece and a second end that is one of directly and indirectly attached to the cover, and
      an attachment portion that attaches the first piece to the cover, wherein
   the second piece is laminated on the first piece and covers the attachment portion,
   the first end of the second piece has an inner fold line resulting from an inward fold of the sheet,
   the first piece extends from the inner fold line and is sewn to the cover by at least one sew line, and
   the at least one sew line has a longitudinal portion that extends along the inner fold line.

10. A vehicle interior component comprising:
    a cover that defines a design surface; and
    a tag attached to the cover, the tag having
       a first piece,
       an attachment portion that attaches the first piece to the cover, the attachment portion includes at least one sew line having a substantially C-shape along a peripheral edge of the first piece, and
       a second piece having
          a first end integrated with the first piece, and
          a second end that is one of directly and indirectly attached to the cover,
    wherein
    the second piece is laminated on the first piece and covers the attachment portion, and
    the second piece covers and hides the at least one sew line which is a fixation position for the first piece and the cover.

* * * * *